(12) United States Patent
Bennett et al.

(10) Patent No.: US 11,993,531 B2
(45) Date of Patent: May 28, 2024

(54) CONVEYOR ROLL END CAP ASSEMBLY

(71) Applicant: GLASSTECH, INC., Perrysburg, OH (US)

(72) Inventors: Terry A. Bennett, Northwood, OH (US); Troy R. Lewandowski, Maumee, OH (US); Brian D. Bils, Harpster, OH (US)

(73) Assignee: Glasstech, Inc., Perrysburg, OH (US)

( * ) Notice: Subject to any disclaimer, the term of this patent is extended or adjusted under 35 U.S.C. 154(b) by 498 days.

(21) Appl. No.: 17/278,320

(22) PCT Filed: Sep. 19, 2019

(86) PCT No.: PCT/US2019/051838
§ 371 (c)(1),
(2) Date: Mar. 21, 2021

(87) PCT Pub. No.: WO2020/061260
PCT Pub. Date: Mar. 26, 2020

(65) Prior Publication Data
US 2021/0347675 A1 Nov. 11, 2021

Related U.S. Application Data

(60) Provisional application No. 62/734,279, filed on Sep. 21, 2018.

(51) Int. Cl.
*C03B 35/18* (2006.01)
*B65G 39/09* (2006.01)
(Continued)

(52) U.S. Cl.
CPC ............ *C03B 35/186* (2013.01); *B65G 39/09* (2013.01); *B65G 49/063* (2013.01);
(Continued)

(58) Field of Classification Search
CPC ... C03B 35/186; C03B 35/165; C03B 35/181; B65G 39/09; B65G 49/063; B65G 2201/022; F16C 13/00; F16C 2326/58
See application file for complete search history.

(56) References Cited

U.S. PATENT DOCUMENTS 3,867,748 A * 2/1975 Miller .................. C03B 35/165
198/780
4,140,486 A * 2/1979 Nitschke ............... C03B 35/186
198/780
(Continued)

FOREIGN PATENT DOCUMENTS

CN 1284470 A 2/2001
CN 106986154 A 7/2017
(Continued)

OTHER PUBLICATIONS

PCT International Search Report and Written Opinion dated Dec. 10, 2019, Application No. PCT/US2019/051838, Applicant Glasstech, Inc., 8 Pages.
(Continued)

*Primary Examiner* — Gene O Crawford
*Assistant Examiner* — Abby A Jorgensen
(74) *Attorney, Agent, or Firm* — Brooks Kushman P.C.

(57) ABSTRACT

An end cap assembly for a conveyor roll includes an end cap configured to fit over an end of the conveyor roll, and the end cap has an opening. The end cap assembly further includes a spring member configured to be positioned between the end of the conveyor roll and the end cap, and a fastener that is insertable into the opening of the end cap. The fastener is configured to cooperate with the spring member to apply a retention force to assist in retaining the end cap on the conveyor roll.

21 Claims, 6 Drawing Sheets

(51) Int. Cl.
B65G 49/06 (2006.01)
C03B 35/16 (2006.01)

(52) U.S. Cl.
CPC .......... *C03B 35/165* (2013.01); *C03B 35/181* (2013.01); *B65G 2201/022* (2013.01)

(56) References Cited

U.S. PATENT DOCUMENTS

| | | | | |
|---|---|---|---|---|
| 4,339,158 | A | * | 7/1982 | Greener ................. F16C 35/07 384/489 |
| 4,399,598 | A | * | 8/1983 | Page ..................... C03B 35/165 65/370.1 |
| 4,421,482 | A | * | 12/1983 | McMaster ................ D04C 1/12 432/236 |
| 4,725,300 | A | * | 2/1988 | McMaster ............. C03B 35/165 65/273 |
| 4,992,088 | A | * | 2/1991 | Sassanelli ............ C03B 35/181 65/106 |
| 5,119,922 | A | * | 6/1992 | Yamaguchi ............. F16D 1/104 403/301 |
| 5,146,675 | A | * | 9/1992 | Ford ....................... F16C 13/00 65/370.1 |
| 5,297,670 | A | * | 3/1994 | Yamaguchi ........... F27B 9/2407 384/549 |
| 5,316,129 | A | | 5/1994 | Daily |
| 5,370,596 | A | * | 12/1994 | Compagnon ............. F27B 9/24 403/29 |
| 5,906,567 | A | * | 5/1999 | Gautier .................. F27D 3/026 492/42 |
| 7,913,835 | B2 | | 3/2011 | Gautier et al. |
| 2017/0121212 | A1 | * | 5/2017 | Schnabel, Jr. ......... C03B 35/163 |
| 2017/0253521 | A1 | * | 9/2017 | Schnabel, Jr. ......... B65G 39/09 |

FOREIGN PATENT DOCUMENTS

| | | | | | |
|---|---|---|---|---|---|
| CN | 106986154 | A | * | 7/2017 | |
| CN | 107244536 | A | | 10/2017 | |
| CN | 107244536 | A | * | 10/2017 | |
| EP | 70244 | A | * | 1/1983 | .......... C03B 35/165 |
| EP | 83966 | A | * | 7/1983 | ............. B65G 39/02 |
| EP | 0615960 | A | * | 9/1994 | |
| EP | 2 042 450 | B1 | | 2/2011 | |
| GB | 476125 | A1 | * | 12/1937 | |
| WO | WO-2017167920 | A1 | * | 10/2017 | ............. B65G 39/02 |
| WO | WO-2017167920 | A1 | * | 12/2017 | ............. B65G 39/02 |
| WO | 2018/167282 | A1 | | 9/2018 | |
| WO | WO-2018167282 | A1 | * | 9/2018 | ................ F16B 1/00 |
| WO | WO-2020061260 | A1 | * | 3/2020 | ............. B65G 39/09 |

OTHER PUBLICATIONS

PCT International Preliminary Report on Patentability dated Apr. 1, 2021, Application No. PCT/US2019/051838, Applicant Glasstech, Inc. 7 Pages.
Chinese Office Action (with English Machine Translation) dated Dec. 2, 2022, Application No. 201980062014.7, 20 Pages.
Taiwanese Office Action and Search Report (with English Machine Translation) dated Jun. 13, 2023, Application No. 108134047, Applicant Glasstech, Inc., 13 Pages.
Taiwanese Office Action & Search Report Application No. 108134047 dated Jun. 13, 2023, English Machines Translation (Official Letter & Search Report).
CN 1284470 A, Abstract & Machine Translation.

* cited by examiner

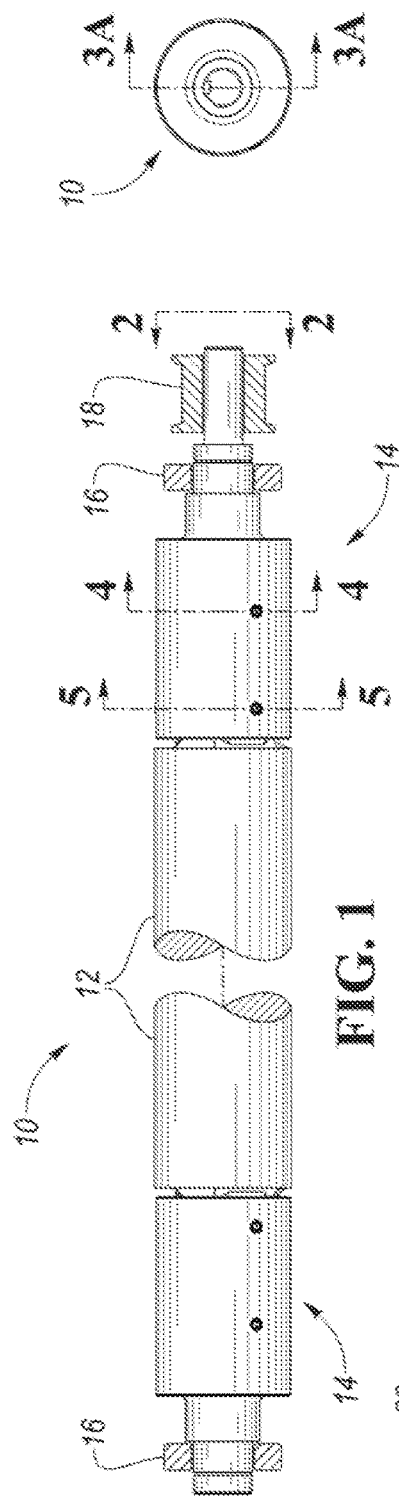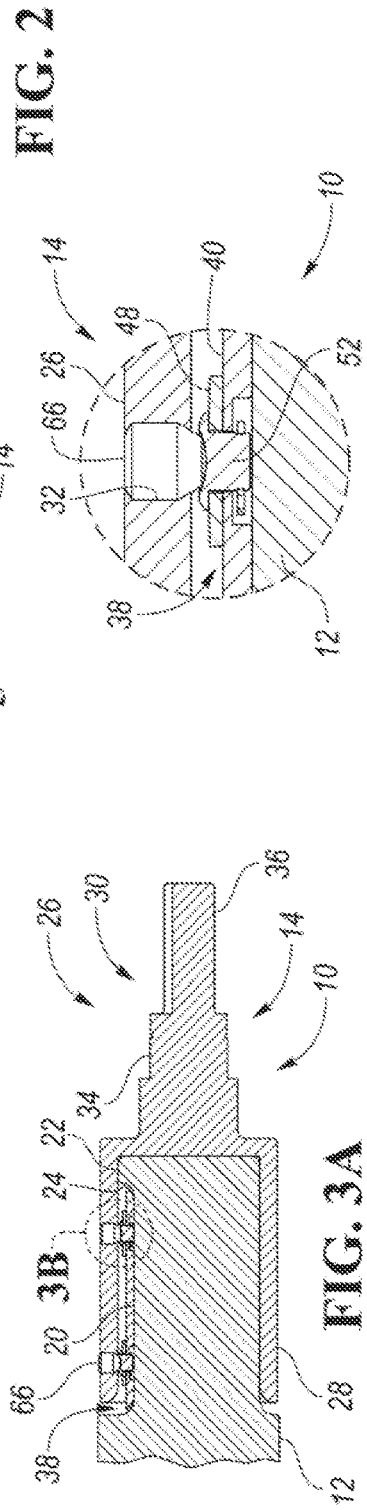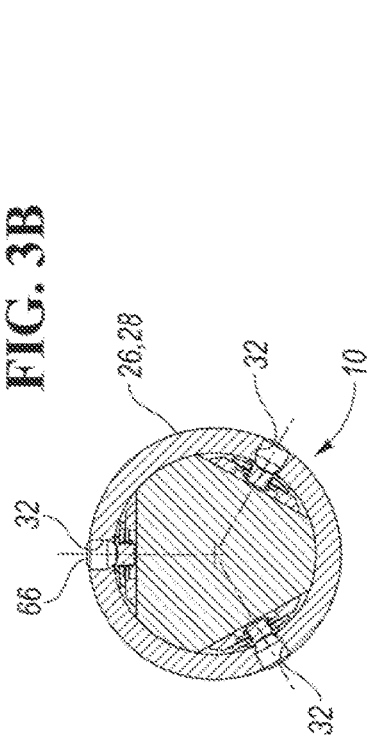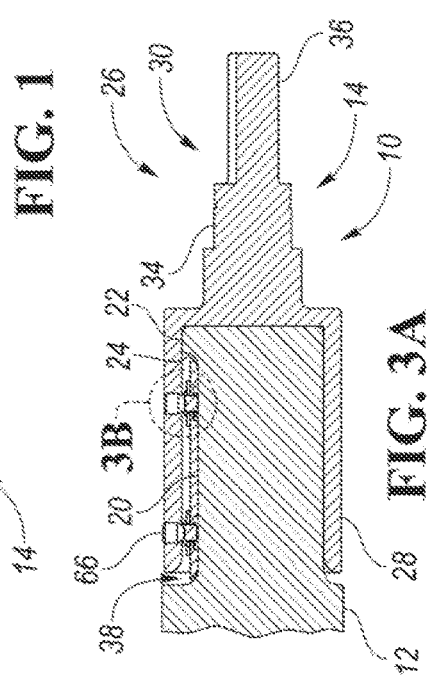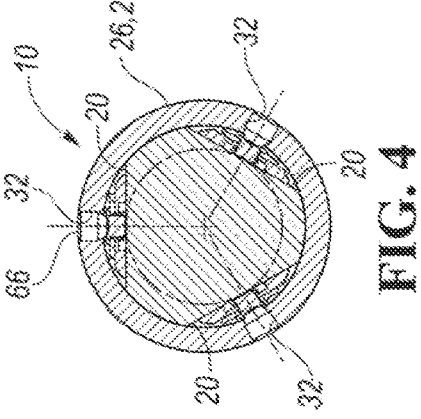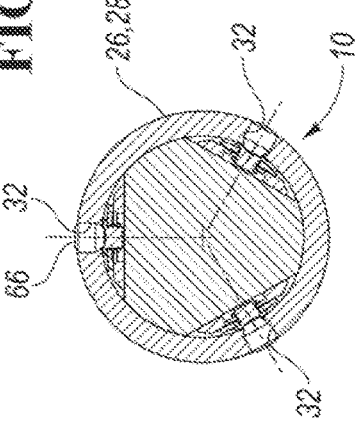

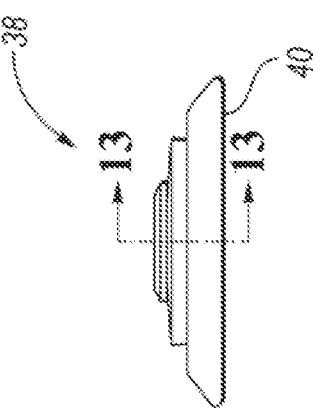
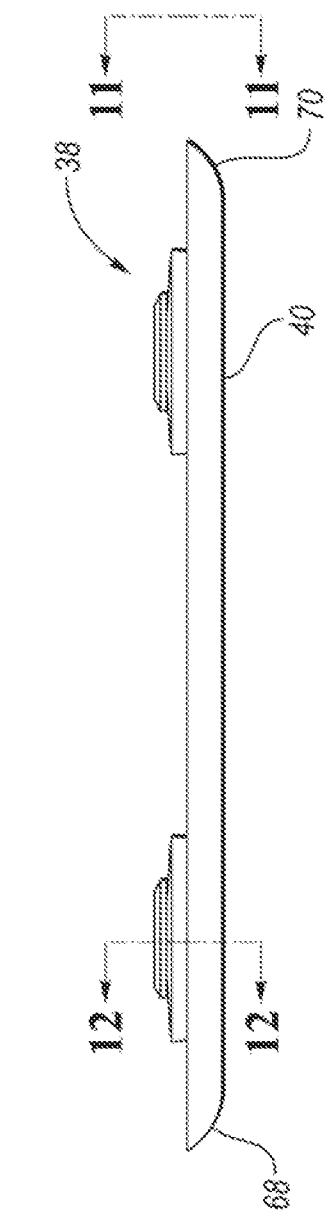
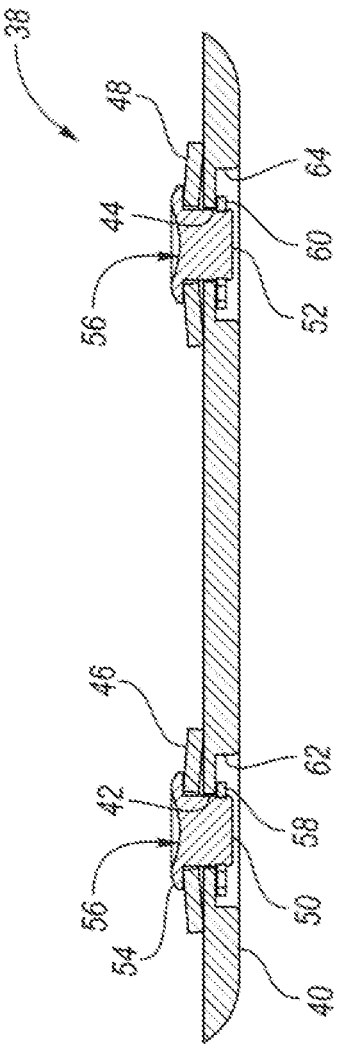
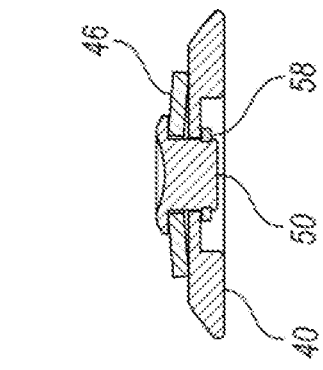

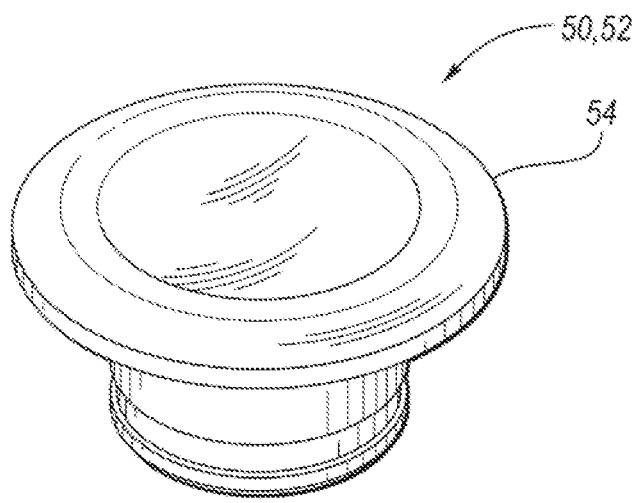
FIG. 19
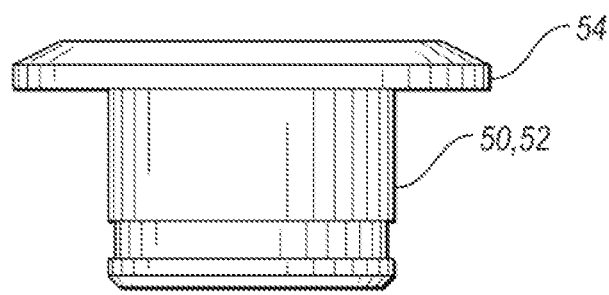
FIG. 20
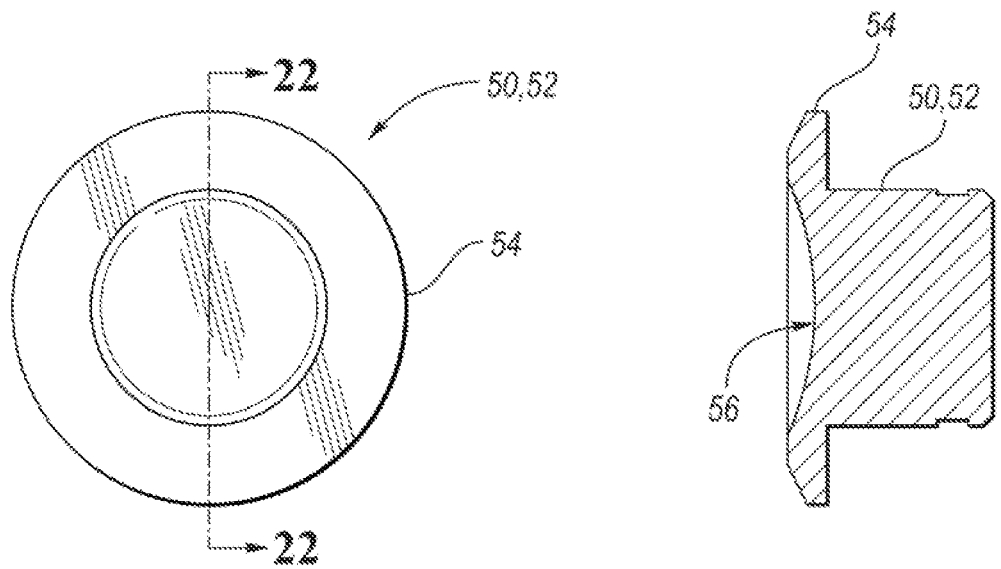
FIG. 21
FIG. 22

CONVEYOR ROLL END CAP ASSEMBLY

CROSS-REFERENCE TO RELATED APPLICATIONS

This application is the U.S. national phase of PCT Application No. PCT/US2019/051838 filed on Sep. 19, 2019, which claims the benefit of U.S. provisional application Ser. No. 62/734,279 filed on Sep. 21, 2018, the disclosures of which are hereby incorporated in their entireties by reference herein.

TECHNICAL FIELD

The disclosure relates to an end cap assembly for a conveyor roll, and a conveyor roll arrangement including an end cap assembly.

BACKGROUND

A conveyor roll arrangement used in high temperature applications may include a ceramic roll and end caps or end cap assemblies positioned on ends of the roll. Examples of such end cap assemblies are disclosed in U.S. Pat. Nos. 5,146,675, 5,316,129 and 7,913,835.

SUMMARY

An end cap assembly according to the disclosure is provided for a conveyor roll. The end cap assembly includes an end cap configured to fit over an end of the conveyor roll, and the end cap has an opening. The end cap assembly further includes a spring member configured to be positioned between the end of the conveyor roll and the end cap, and a fastener that is insertable into the opening of the end cap. The fastener is configured to cooperate with the spring member to apply a retention force to assist in retaining the end cap on the conveyor roll.

A conveyor roll arrangement according to the disclosure includes a conveyor roll having an end, and an end cap assembly including an end cap positioned on the end of the conveyor roll. The end cap assembly may further include a spring member positioned between the end of the conveyor roll and the end cap, and a fastener positioned in an opening of the end cap. The fastener cooperates with the spring member to apply a retention force to assist in retaining the end cap on the conveyor roll.

According to one embodiment of the disclosure, a conveyor roll arrangement includes a conveyor roll having an end with three flat sections spaced apart from each other, and the conveyor roll comprises a ceramic material. The conveyor roll arrangement further includes an end cap assembly including an end cap having a tubular portion and a support portion extending from the tubular portion. The tubular portion is positioned on the end of the conveyor roll and includes three pairs of threaded openings spaced equally about a circumference of the tubular portion. The end cap assembly also includes three spring assemblies that are each positioned on one of the flat sections of the conveyor roll Each spring assembly may include a plate having first and second spaced apart openings, first and second pins that extend into the first and second openings, respectively, and that each have a flange, first and second spring washers disposed about the first and second pins, respectively, so that each spring washer is disposed between a respective one of the flanges and the plate, and first and second snap rings engaged with the first and second pins, respectively, and disposed on a side of the plate opposite the spring washers. The end cap assembly further includes six threaded fasteners that are each engaged with one of the threaded openings of the tubular portion of the end cap. Each threaded fastener is engaged with a respective pin of one of the spring assemblies. Furthermore, the threaded fasteners cooperate with the spring assemblies to assist in retaining the end cap on the conveyor roll.

BRIEF DESCRIPTION OF THE DRAWINGS

FIG. 1 is an elevation view of a hot glass sheet conveyor roll arrangement according to the disclosure that includes a round conveyor roll of an elongated shape having opposite ends, and an end cap assembly provided at each end of the conveyor roll;

FIG. 2 is an end view of the conveyor roll arrangement viewed in the direction of arrows 2-2 in FIG. 1 and illustrating one of the end cap assemblies;

FIG. 3A is a fragmentary sectional view taken along line 3A-3A of FIG. 2 showing a right end of the conveyor roll and the associated end cap assembly;

FIG. 3B is an enlarged view of a portion of FIG. 3A illustrating a portion of a retainer assembly of the end cap assembly of FIG. 3A;

FIG. 4 is a sectional view taken along line 4-4 of FIG. 1 showing portions of three retainer assemblies of the end cap assembly of FIG. 1, as well as three associated fasteners that cooperate with the retainer assemblies to apply retaining forces to assist in retaining the end cap assembly on the conveyor roll;

FIG. 5 is a sectional view taken along line 5-5 of FIG. 1 showing other portions of the three retainer assemblies of the end cap assembly of FIG. 1, as well as three other associated fasteners;

FIG. 10 is a side view of one of the retainer assemblies;

FIG. 11 is an end view of the retainer assembly of FIG. 10 viewed in the direction of arrows 11-11 in FIG. 10;

FIG. 12 is a sectional view through the retainer assembly taken along line 12-12 in FIG. 10 and showing a spring member of the retainer assembly in an unloaded or uncompressed condition;

FIG. 13 is a sectional view taken along line 13-13 in FIG. 11 to further illustrate the construction of the retainer assembly prior to mounting of the end cap assembly on the end of the conveyor roll, wherein the retainer assembly includes first and second spring members, a retainer plate having first and second openings, first and second engagement members inserted into the first and second spring members, respectively, and extending through the first and second openings, respectively, of the retainer plate, and first and second retainer that may be used to secure the engagement members and associated spring members to the retainer plate;

FIGS. 19, 20 and 21 are perspective, side, and tope views, respectively, of one of the engagement members shown in FIG. 13; and FIG. 22 is a sectional view of the engagement member of FIG. 21 taken along line 22-22 in FIG. 21.

Figure 6:
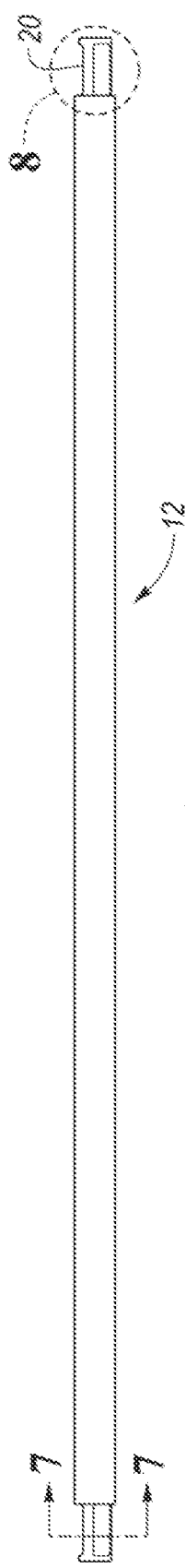
FIG. 6 is an elevation view of the conveyor roll of FIG. 1.
Figure 8:
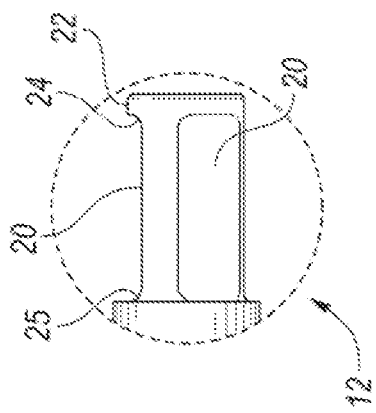
FIG. 8 is an enlarged view of a portion of the right end of the conveyor roll.
Figure 7:
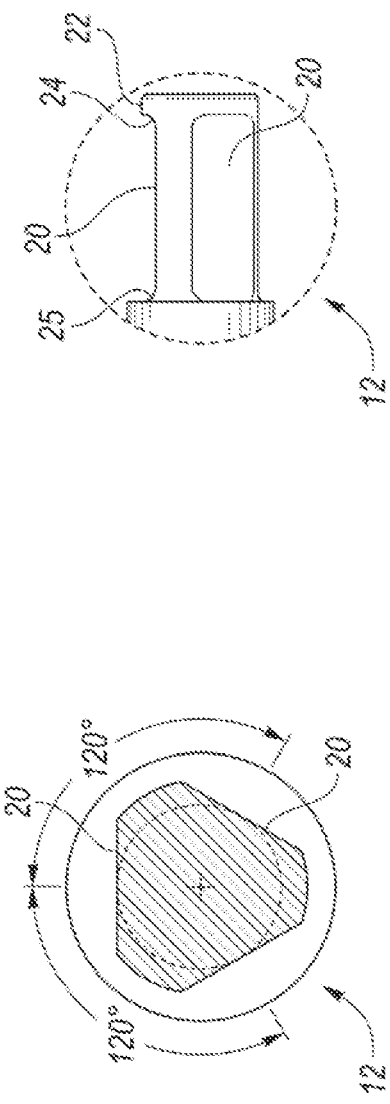
FIG. 7 is a sectional view taken along line 7-7 of FIG. 6 showing three recessed portions formed on a left end of the conveyor roll.
Figure 9:
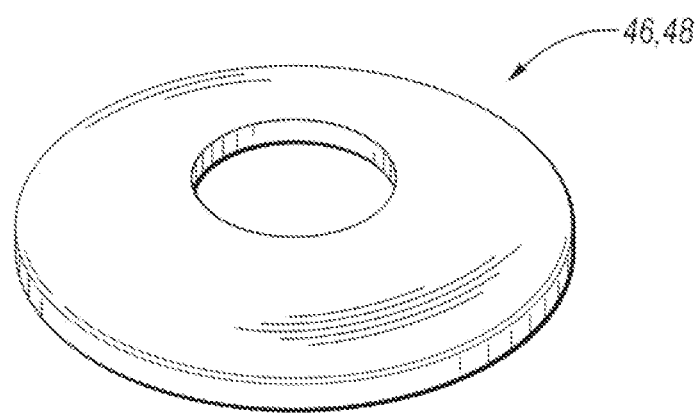
FIG. 9 is a perspective view of a spring member utilized in the retainer assemblies.

While exemplary embodiments are illustrated and disclosed, such disclosure should not be construed to limit the claims. It is anticipated that various modifications and alternative designs may be made without departing from the scope of the disclosure.

DETAILED DESCRIPTION

As required, detailed embodiments are disclosed herein; however, it is to be understood that the disclosed embodiments are merely exemplary, and that various and alternative forms may be employed. The figures are not necessarily to scale; some features may be exaggerated or minimized to show details of particular components. Therefore, specific structural and functional details disclosed herein are not to be interpreted as limiting, but merely as a representative basis for teaching one skilled in the art.

FIG. 1 illustrates a conveyor roll arrangement 10 according to the present disclosure. The conveyor roll arrangement 10 may be used in a high-temperature application, for example, for conveying glass sheets during a heating and/or bending operation. As a more detailed example, multiple conveyor roll arrangements 10 may be used in a conveyor system that is configured to convey glass sheets from one end to another end of a furnace (not shown) that is used to heat each glass sheet to a temperature of at least 400° C., or at least 500° C., or at least 60€1° C., or at least 700° C.

The conveyor roll arrangement 10 includes a conveyor roller or roll 12 and an end cap assembly 14 at each end of the conveyor roll 12, wherein the end cap assemblies 14 include a novel retention configuration or arrangement for retaining the end cap assemblies 14 on the conveyor roll 12, as explained below in detail. The end cap assemblies 14 may also be configured to be supported by bearings 16, and one or both of the end cap assemblies 14 may be configured to be driven by a drive system. For example, the rightmost end cap assembly 14 shown in FIG. 1 may be attached to a drive pulley 18, and the drive pulley 18 may be connected to a drive system, such as a belt drive system, for rotating the conveyor roll arrangement 10.

The conveyor roll 12 may be made of any suitable material sufficient to withstand high temperature applications, such as applications in which temperatures may reach at least 400° C., or at least 500° C., or at least 600° C., or at least 700° C. For example, the conveyor roll 12 may be made of a low thermal expansion ceramic material, such as sinter bonded amorphous silica particles, or a composite material, such as fused silica, metal-ceramic, or other composite ceramic material. Referring to FIGS. 3A-8, each end of the conveyor roll 12 may include one or more recessed sections, such as flat sections 20, for receiving a portion of one of the end cap assemblies 14, as explained below in detail. In the illustrated embodiment, each end of the conveyor roll 12 includes three flat sections 20 that are spaced equally apart from each other. Furthermore, the conveyor roll 12 includes a raised lip or flange 22 adjacent a distal end of each flat section 20, and each flange 22 includes a radiused or curved transition section 24 extending from each corresponding flat section 20. Likewise, the conveyor roll 12 includes a radiused or curved transition section 25 that extends between an opposite end of each flat section 20 and a main body of the conveyor roll 12. With such a configuration, the conveyor roll 12 avoids sharp corners that may create high stress points, which may weaken the conveyor roll/end cap assembly connection interface.

Further details of the rightmost end cap assembly 14 shown in FIG. 1 will now be explained in more detail, with the understanding that the leftmost end cap assembly 14 shown in FIG. 1 may include the same or similar features. Referring to FIG. 3A, the illustrated end cap assembly 14 includes an end cap 26 having a tubular portion 28 and a support portion 30 extending from the tubular portion 28. The tubular portion 28 is positioned on the end of the conveyor roll 12 and includes one or more openings 32 for receiving fasteners, as explained below in detail. Referring to FIGS. 3A-5, the illustrated embodiment includes three pairs of threaded openings 32 spaced equally about a circumference of the tubular portion 28, Each pair of openings 32 includes two openings 32 that are axially aligned with each other and spaced longitudinally apart. For example, each pair of openings 32 may be spaced longitudinally apart center-to-center by a distance of at least 20 mm, such as in the range of 20 to 60 mm. As another example, each pair of openings 32 may be spaced longitudinally apart center-to-center by a distance of 60 mm or more, depending on the size of the end cap 26.

The support portion 30 is configured to cooperate with one or more bearings 16 and/or the above-mentioned drive system 20. For example, the end cap assembly 14 shown in FIG. 3A includes a bearing section 34 configured to receive a bearing 16 shown in FIG. 1, and a drive section 36 configured to receive the drive pulley 18 shown in FIG. 1. In the embodiment shown in FIG. 1, the leftmost end cap assembly 14 is not connected to a drive pulley. As a result, the support portion of that end cap assembly is shorter than the support portion 30 shown in FIG. 3A.

Referring to FIGS. 3A-5 and 9-13, the illustrated end cap assembly 14 further includes one or more retainer assemblies 38, such as spring, assemblies, that are each positionable on one of the flat sections 20 of the conveyor roll 12. In the illustrated embodiment, the end cap assembly 14 includes three retainer assemblies 38 that each include a retainer plate 40 having first and second spaced apart openings 42 and 44, respectively, (e.g., spaced center-to-center according to the spacing of a corresponding pair of openings 32 of the end cap 26), and first and second spring members 46 and 48, respectively, associated with the first and second openings 42 and 44, respectively. While the spring members 46 and 48 may comprise any suitable spring, in the illustrated embodiment, the spring members 46 and 48 are formed as spring washers, such as Belleville disk washers, which may also be referred to as conical spring washers or cupped spring washers. Such washers may be loaded along their axes and have a frusta-conical shape that provides a spring characteristic.

Each retainer assembly 38 further includes first and second engagement members 50 and 52, respectively, that extend into the first and second openings 42 and 44, respectively, of the retainer plate 40. Each engagement member 50 and 52 may have any suitable configuration, such as a pin, and may be a solid member or a hollow member, such as a tubular member. Furthermore, each engagement member 50 and 52 may have a flange 54 and an engagement surface 56 that is engageable with a fastener as explained below in greater detail. The engagement surface 56 may likewise have any suitable configuration, such as a concave surface or a conical surface.

Figure 14:
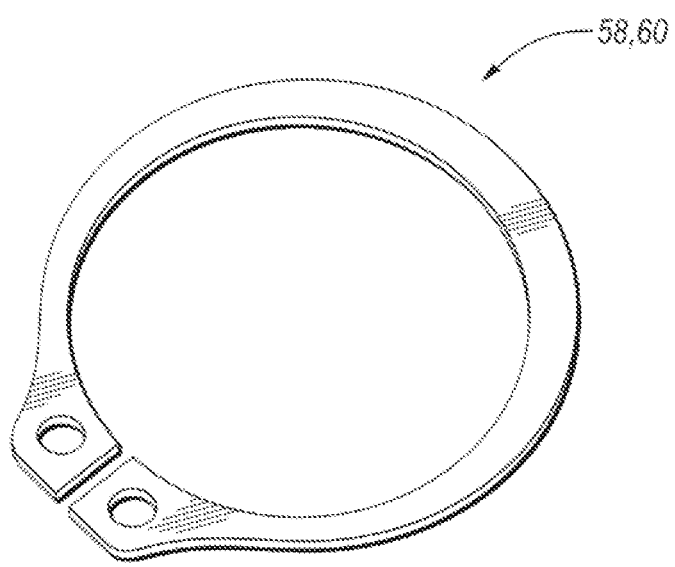
FIG. 14 is a perspective view of one of the retainers.
Figure 15:
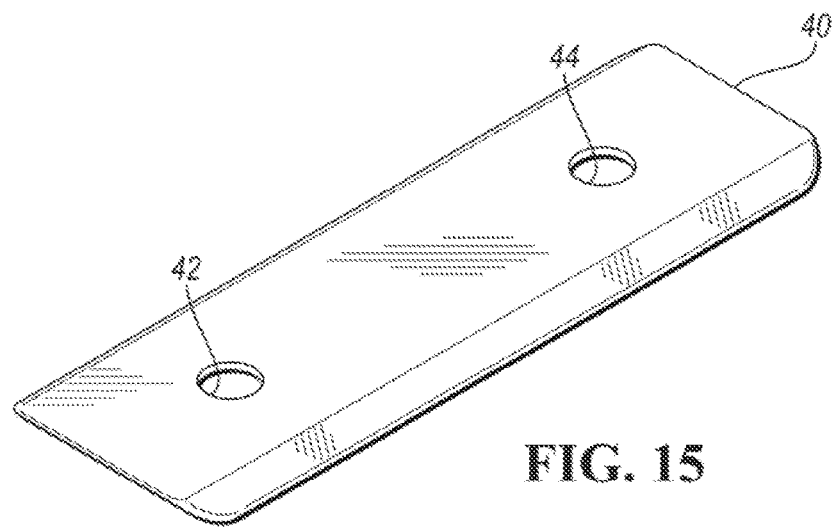
FIGS. 15, 16, 17 and 18 are perspective, top, side and end views, respectively, of the retainer plate of the retainer assembly shown in FIG. 13.
Figure 16:
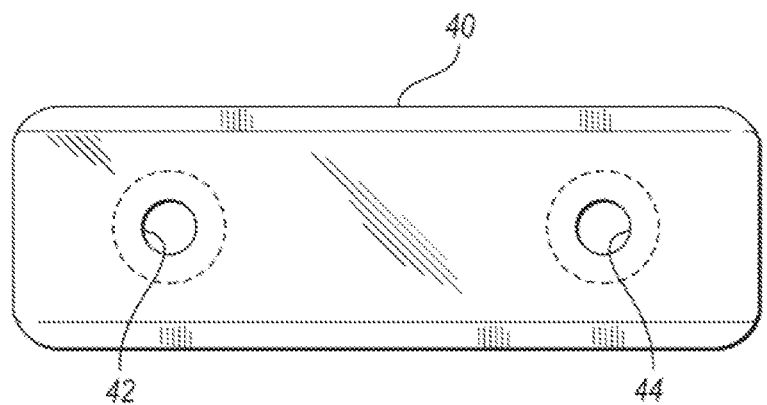
Figure 17:
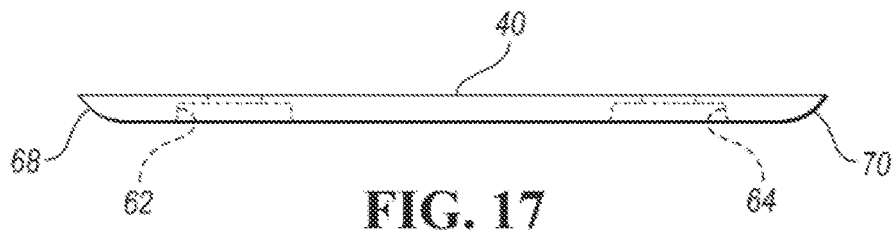
Figure 18:
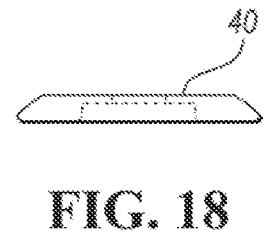

Referring to FIGS. 13 and 14, each retainer assembly 38 also includes first and second retainers 58 and 60, respectively, for securing the engagement members 50 and 52 to the retainer plate 40. For example, the retainers 58 and 60 may be formed as snap rings or retainer clips that are each engageable with a groove formed in one of the engagement members 50 and 52.

When assembled together, the first and second engagement members 50 and 52 extend through openings formed in the first and second spring members 46 and 48, respectively, and into the first and second openings 42 and 44, respectively, of the retainer plate 40, so that each spring member 46 and 48 is disposed between a respective one of the flanges 54 and the retainer plate 40. Furthermore, the first and second retainers 58 and 60, respectively, are engaged with the first and second engagement members 50 and 52, respectively, so that the retainers 58 and 60 are disposed on a side of the retainer plate 40 opposite the spring members 46 and 48. As shown in FIG. 13, the retainer plate 40 may also include first and second recessed areas or notches 62 and 64, respectively, for receiving ends of the engagement members 50 and 52 and the retainers 58 and 60.

Returning to FIGS. 3A-5, the endcap assembly 14 further includes one or more fasteners 66 that are each insertable into an opening 32 of the end cap 26 and configured to cooperate with one of the spring members 46 and 48 to apply a retention force to assist in retaining the end cap 26 on the conveyor roll 12. In the illustrated embodiment, the end cap assembly 14 includes six fasteners 66, such as threaded screws or set screws, that are each engaged with one of the threaded openings 32 of the tubular portion 28 of the end cap 26. Furthermore, each fastener 66 is engaged with a respective engagement member 50, 52 of one of the retainer assemblies 38, and the fasteners 66 cooperate with the retainer assemblies 38 to assist in retaining the end cap 26 on the conveyor roll 12. For example, each fastener 66 may engage an engagement surface 56 of a respective engagement member 50, 52 and cause the engagement member 50, 52 to compress or load a respective spring member 46, 48, so that the spring member 46, 48 applies a retention force on a respective retainer plate 40.

Components of the end cap assembly 14 may be made of any suitable material and in any suitable manner. For example, the end cap 26 may be made of cast metal, such as stainless steel or any other suitable metal alloy. The retainer plate 40, the spring members 46 and 48, the engagement members 50 and 52 and the retainers 58 and 60 may also be made of metal, such as stainless steel or any other suitable metal alloy.

To assemble each end cap assembly 14 onto the conveyor roll 12, the retainer assemblies 38 of the end cap assembly 14 may be preassembled together. For example, each engagement member 50, 52 may be inserted into a respective spring member 46, 48, and into a respective opening 42, 44 of a respective retainer plate 40, and then each engagement member 50, 52 may be secured to the respective retainer plate 40 using a respective retainer 58, 60. Each retainer assembly 38 may then be mounted on a particular flat section 20 of the conveyor roll 12. For example, each retainer plate 40 of each retainer assembly 38 may be mounted on a flat section 20 using an adhesive, such as a liquid adhesive or double-sided tape.

Each recessed section of the conveyor roll 12 that defines a particular flat section 20 is set to a depth so that when the retainer assemblies 38 are mounted on the conveyor roll 12, the corresponding end cap 26 can be slid onto the stub or end of the conveyor roll 12 even when the spring members 46, 48 are in an unloaded state, such as shown in FIGS. 12 and 13. Nonetheless, the conveyor roll arrangement 10 may be configured so that there is a slight interference fit between the end cap 26 and the corresponding end of the conveyor roll 12 to facilitate setting concentricity between the end cap 26 and the end of the conveyor roll 12 (e.g., so that a central axis of the end cap 26 is aligned with a central axis of the conveyor roll 12 to within a suitable tolerance, such as 0.001 inches, as shown in FIG. 3A). The end cap 26 may therefore need to be heated slightly so that it expands to enable the end cap 26 to be installed on the conveyor roll 12. The end cap 26 and/or the conveyor roll 12 may also include one or more alignment indicators (e.g., markings, projections, notches, etc.) to help align the openings 32 of the end cap 26 directly above heads of the corresponding engagement members 50, 52. Furthermore, the flange 22 at the distal end of the conveyor roll 12 is configured to assist in maintaining the end cap 26 on the conveyor roll 12 by restricting longitudinal movement of the retainer assemblies 38. Each retainer plate 40 may also have radiused or curved ends 68 and 70 that are configured to mate with the transition sections 24 and 25 of the conveyor roll 12 to assist in restricting longitudinal movement of the retainer assemblies 38.

After the end cap 26 has been pushed onto the end of the conveyor roll 12, the fasteners 66 may be installed into the openings 32 of the end cap 26. A high temperature thread lock may also be used to assist in retaining the fastener 66 in the openings 32.

The fasteners 66 may then be turned or screwed into the end cap 26 until they are flush with an outside wall of the end cap 26. This will result in each spring member 46, 48 being put into a loaded state or condition (e.g., compressed condition) by a respective engagement member 50, 52, such as shown in FIG. 3B. The spring members 46, 48 may then provide sufficient mechanical spring force to maintain the end cap 26 on the end of the conveyor roll 12, and maintain the concentricity between the end cap 26 and the conveyor roll 12, as the end cap 26 expands during heating, such as heating by a furnace, as well as when the end cap 26 cools back down, such as when the furnace is idling or off.

Referring to FIGS. 4 and 5, by using three retainer assemblies 38 that are spaced equally about a circumference of the end of the conveyor roll 12, and corresponding fasteners 66 that are likewise spaced equally apart about a circumference of the end cap 26, the retention forces applied by the fasteners 66 and the retainer assemblies 38 may cooperate to keep the end cap 26 concentric to the conveyor roll 12. In that regard, central, radially extending axes of the retainer assemblies 38 may be spaced 120° from each other about the central, longitudinal axis of the end cap 26 and the aligned central, longitudinal axis of the conveyor roll 12 as shown in FIG. 4. As a result, the retention forces may be applied at 120° angle intervals about a circumference of the end cap 26, thereby enabling equal compressive forces to be applied around the periphery of the conveyor roll arrangement 10.

Referring to FIG. 3A, use of two spring members 46, 48 and two fasteners 66 per retainer assembly 38 (i.e., tandem spring members and tandem fasteners) may assist in maintaining the end cap 26 concentric with the conveyor roll 12. For example, such a configuration may inhibit rocking of the end cap 26. In that regard, such a configuration may balance the end cap 26 and provide three over a wider area, thereby keeping the end cap 26 tightly mounted to the conveyor roll 12 along its longitudinal axis.

In other embodiments, an end cap assembly according to the disclosure may include any suitable number of retainer assemblies, such as one, two, three, or more than three retainer assemblies, and each retainer assembly may include a retainer plate having one, two, or more than two openings, as well as a corresponding number of spring members, engagement members and/or retainers. Likewise, the end cap assembly may include a corresponding number of fasteners that cooperate with the retainer assemblies to apply a retention force. Still further, an end cap assembly according to the disclosure may include a spring member that is formed with a projection that is alignable with an opening formed in a retainer plate or a recess formed in a conveyor roll, and a fastener that is directly engageable with the spring member to cause the spring member to change from an unloaded state to a loaded state. Generally then, an end cap assembly according to the disclosure may include one or more fasteners that cooperate with one or more spring members to apply a retention force to assist in retaining the end cap of the endcap assembly on a conveyor roll.

With any of the above configurations, end caps may be efficiently replaced as needed. For example, if a bearing freezes on an end cap and/or damages a mounting surface of the end cap, a replacement end cap may be installed as long as the corresponding conveyor roll is not damaged. Furthermore, some or all of the end cap retention arrangement may be reused if not damaged.

While exemplary embodiments are described above, it is not intended that these embodiments describe all possible forms according to the disclosure. The words used in the specification are words of description rather than limitation, and it is understood that various changes may be made without departing from the spirit and scope of the disclosure. Additionally, the features of various implementing embodiments may be combined to Corm further embodiments according to the disclosure.

What is claimed is:

1. An end cap assembly for a conveyor roll, the end cap assembly comprising:
   an end cap configured to fit over an end of the conveyor roll, the end cap having an opening;
   a spring member configured to be positioned between the end of the conveyor roll and the end cap;
   a fastener that is insertable into the opening of the end cap and configured to cooperate with the spring member to apply a retention force to assist in retaining the end cap on the conveyor roll; and
   an engagement member configured to extend into the spring member and that is engageable with the fastener when the fastener is inserted into the opening of the end cap.

2. The end cap assembly of claim 1 wherein the spring member comprises a spring washer.

3. The end cap assembly of claim 1 wherein the engagement member comprises a pin having a concave end surface configured to receive an end of the fastener.

4. The end cap assembly of claim 1 further comprising a plate having an opening configured to receive the engagement member, the plate being configured to be positioned on a flat section formed on the end of the conveyor roll.

5. The end cap assembly of claim 4 wherein the engagement member and the spring member are mountable on the plate prior to positioning the plate on the flat section of the conveyor roll, and wherein the engagement member has a flange and the spring member is positioned between the flange and the plate when the engagement member and the spring member are mounted on the plate.

6. The end cap assembly of claim 4 wherein the end cap comprises a longitudinally extending tubular section that is configured to fit over the end of the conveyor roll, the opening of the end cap is formed in the tubular section, the tubular section further has an additional opening spaced longitudinally away from the opening of the end cap, and the plate has an additional opening spaced longitudinally away from the opening of the plate, and wherein the end cap assembly further comprises an additional spring member configured to be positioned between the end of the conveyor roll and the end cap, an additional fastener that is insertable into the additional opening of the end cap, and an additional engagement member configured to extend into the additional spring member and the additional opening of the plate, so that the additional engagement member is engageable with the additional fastener when the additional fastener is inserted into the additional opening of the end cap.

7. The end cap assembly of claim 1 wherein the end cap has an additional opening spaced away from the opening, and the end cap assembly further includes an additional spring member configured to be positioned between the end of the conveyor roll and the end cap, and an additional fastener that is insertable into the additional opening of the end cap and configured to cooperate with the additional spring member to apply an additional retention force to assist in retaining the end cap on the conveyor roll.

8. The end cap assembly of claim 1 wherein the end cap has two additional openings spaced equally apart from the opening about a circumference of the end cap, and the end cap assembly further includes two additional spring members configured to be positioned between the end of the conveyor roll and the end cap, and two additional fasteners that are each insertable into a respective one of the additional openings of the end cap and configured to cooperate with a respective one of the additional spring members to apply an additional retention force to assist in retaining the end cap on the conveyor roll.

9. A conveyor roll arrangement comprising:
   a conveyor roll having an end; and
   an end cap assembly including an end cap positioned on the end of the conveyor roll, a spring member positioned between the end of the conveyor roll and the end cap, an engagement member that extends into the spring member, and a fastener positioned in an opening of the end cap and engaged with the engagement member, wherein the fastener cooperates with the engagement member and the spring member to apply a retention force to assist in retaining the end cap on the conveyor roll.

10. The conveyor roll arrangement of claim 9 wherein the opening of the end cap is a threaded opening, the fastener is a threaded fastener, and the spring member comprises a spring washer.

11. The conveyor roll arrangement of claim 9 wherein the engagement member comprises a pin having a concave end surface that engages an end of the fastener.

12. The conveyor roll arrangement of claim 9 wherein the end of the conveyor roll includes a flat section, and the end cap assembly further comprises a plate positioned on the flat section and having an opening that receives the engagement member.

13. The conveyor roll of claim 12 wherein the conveyor roll includes a flange adjacent the flat section, the flange including a curved transition section extending from the flat section.

14. The conveyor roll arrangement of claim 12 wherein the engagement member has a flange and the spring member is positioned between the flange and the plate.

15. The conveyor roll arrangement of claim 12 wherein the end cap comprises a longitudinally extending tubular section positioned over the end of the conveyor roll, the opening of the end cap is formed in the tubular section, the tubular section further has an additional opening spaced longitudinally away from the opening of the end cap, and the plate has an additional opening spaced longitudinally away from the opening of the plate, and wherein the end cap assembly further comprises an additional spring member positioned between the end of the conveyor roll and the end cap, an additional fastener inserted into the additional opening of the end cap, and an additional engagement member that extends into the additional spring member and the additional opening of the plate, the additional engagement member being engaged with the additional fastener.

16. The conveyor roll arrangement of claim 9 wherein the end cap has an additional opening spaced away from the opening, and the end cap assembly further includes an additional spring member positioned between the end of the conveyor roll and the end cap, and an additional fastener inserted into the additional opening of the end cap and that cooperates with the additional spring member to apply an additional retention force to assist in retaining the end cap on the conveyor roll.

17. The conveyor roll arrangement of claim 9 wherein the end cap has two additional openings spaced equally apart from the opening about a circumference of the end cap, and the end cap assembly further includes two additional spring members positioned between the end of the conveyor roll and the end cap, and two additional fasteners that are each inserted into a respective one of the additional openings of the end cap and that cooperate with a respective one of the additional spring members to apply an additional retention force to assist in retaining the end cap on the conveyor roll.

18. The conveyor roll arrangement of claim 17 wherein the end cap has a tubular section positioned over the end of the conveyor roll, and the opening and the additional openings are formed in the tubular section and are spaced equally apart about a circumference of the tubular section.

19. A conveyor roll arrangement comprising:
a conveyor roll having an end with three flat sections spaced apart from each other, the conveyor roll comprising a ceramic material; and
an end cap assembly including:
an end cap having a tubular portion and a support portion extending from the tubular portion, the tubular portion being positioned on the end of the conveyor roll and including three pairs of threaded openings spaced equally about a circumference of the tubular portion;
three spring assemblies that each include a plate having first and second spaced apart openings, first and second pins that extend into the first and second openings, respectively, and that each have a flange, first and second spring washers disposed about the first and second pins, respectively, so that each spring washer is disposed between a respective one of the flanges and the plate, and first and second snap rings engaged with the first and second pins, respectively, and disposed on a side of the plate opposite the spring washers, each spring assembly being positioned on one of the flat sections of the conveyor roll; and
six threaded fasteners that are each engaged with one of the threaded openings of the tubular portion of the end cap, each threaded fastener engaging a respective pin of one of the spring assemblies, wherein the threaded fasteners cooperate with the spring assemblies to assist in retaining the end cap on the conveyor roll.

20. The end cap assembly of claim 4 further comprising a retainer that is engageable with the engagement member for securing the engagement member to the plate, wherein the retainer and the spring member are positioned on opposite sides of the plate when the engagement member is positioned in the spring member and the retainer is engaged with the engagement member.

21. The conveyor roll arrangement of claim 12 wherein the end cap assembly further comprise a retainer engaged with the engagement member, and wherein the spring member and the retainer are disposed on opposite sides of the plate.

* * * * *